Dec. 14, 1965   J. R. ROCHESTER   3,223,846
PHOTOSENSITIVE OPTICAL FLUID STREAM DIRECTION INDICATOR
Filed Jan. 2, 1962
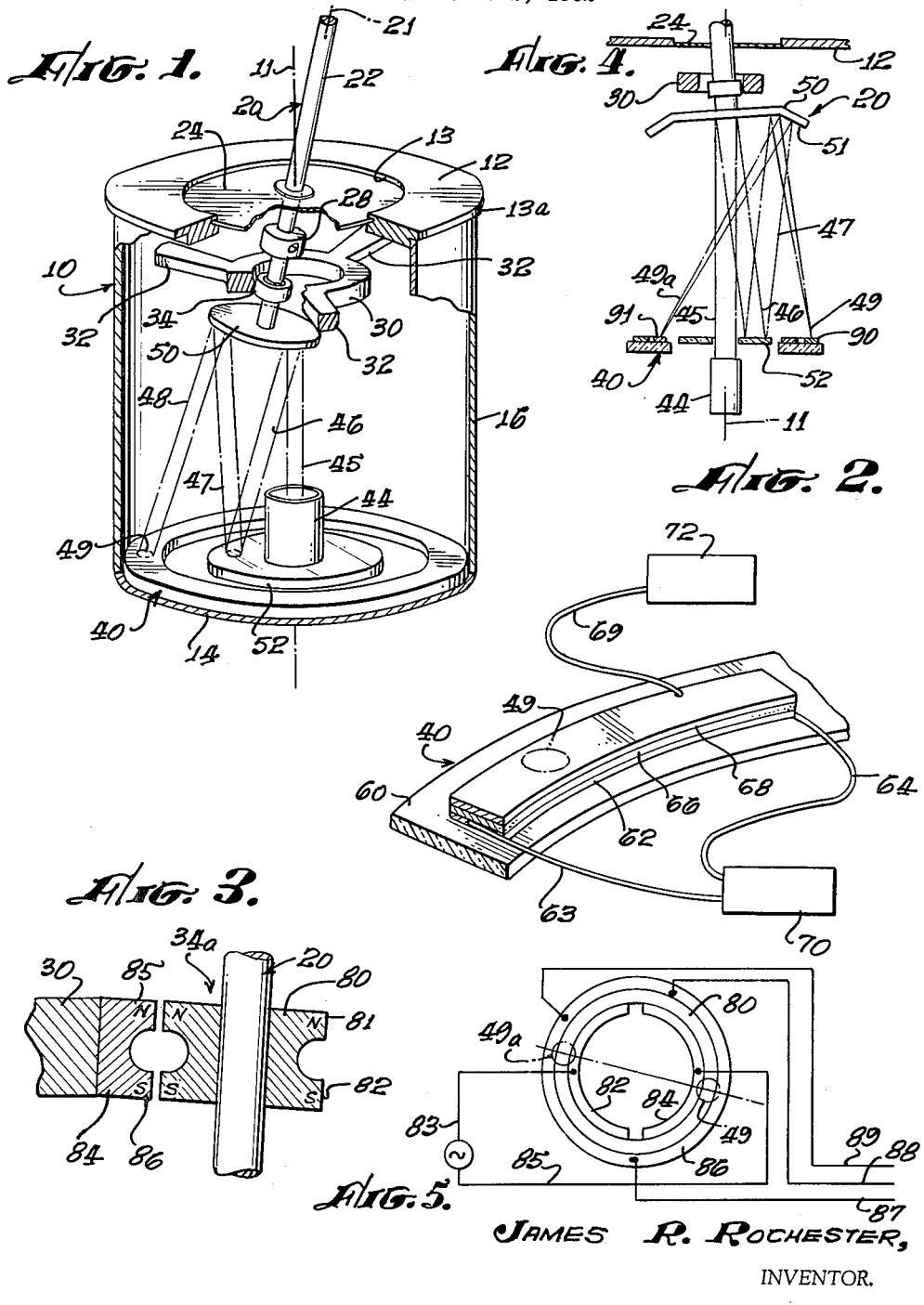
JAMES R. ROCHESTER,
INVENTOR.
BY Barlelew & Lewis United States Patent Office 3,223,846
Patented Dec. 14, 1965

3,223,846
PHOTOSENSITIVE OPTICAL FLUID STREAM
DIRECTION INDICATOR
James R. Rochester, San Gabriel, Calif., assignor to Giannini Controls Corporation, Duarte, Calif., a corporation of New York
Filed Jan. 2, 1962, Ser. No. 163,515
5 Claims. (Cl. 250—234)

This invention has to do with improved means for detecting and measuring the direction of a fluid stream, which may typically comprise an airstream flowing over a surface of an aircraft, missile or the like. Accurate measurement of the direction of such an airstream is particularly useful for indicating pitch and yaw of the vehicle.

More particularly, the invention concerns fluid stream direction indicators of the type that utilize a probe element having axial symmetry and extending transversely into the fluid stream, the probe being mounted to permit swinging movement in the direction of fluid flow. The invention provides especially economical and effective means for detecting the direction of deflection of such a probe.

A general object of the present invention is to produce a fluid stream direction indicator of the described type that is more simple and rugged than previously available instruments, and that does not require expensive maintainance to insure accuracy of response. In preferred form of the invention, only a single moving part is required, and that part may be mounted on a flexure pivot that avoids all problems of friction and wear.

An important characteristic of the invention is that a light beam is utilized as part of the transducer mechanism for translating movement of the probe element into an electrical signal. A particular advantage of that feature is that frictional loading of the probe by the transducer is eliminated.

A particularly effective type of light responsive transducer for the present purpose is that described and claimed in the copending patent application Serial No. 833,278 filed on August 12, 1959, by Alexander J. Moncrieff-Yeates and issued April 23, 1963, as Patent 3,087,069 under the tile, Radiation-Controlled Variable Resistance, and assigned to the same assignee as the present application. As more fully described therein, a light responsive potentiometer may be constructed by interposing a layer of photoconductive material between a resistive layer and an electrode element, the voltage signal tapped from the electrode element corresponding to the longitudinal position at which the photoconductive layer is illuminated. In accordance with one aspect of the present invention, a probe element is so mounted and arranged as to cause a light image to move along an arcuate potentiometer structure, preferably of the type described, in accordance with the azimuth angle of the probe deflection.

In accordance with a further aspect of the invention, a novel and particularly effective optical system is provided for controlling the position of a light beam in accordance with the azimuth of the probe deflection. A particular advantage of that optical system is the possibility of amplifying the radial deflection of the light beam in order to permit increased radius of the potentiometer without sacrifice of extreme compactness of the entire instrument.

A full understanding of the invention and of its further objects and advantages will be had from the following description of certain illustrative manners in which it may be carried out. The particulars of that description, and of the accompanying drawings which form a part of it, are intended only as illustration and not as a limitation upon the scope of the invention, which is defined in the appended claims.

In the drawings:

FIG. 1 is a schematic perspective partially cut away representing an illustrative embodiment of the invention;

FIG. 2 is a schematic fragmentary perspective representing an illustrative transducer;

FIG. 3 is a schematic fragmentary section representing a modification;

FIG. 4 is a fragmentary section representing a modification; and

FIG. 5 is a schematic diagram representing a transducer and circuit arrangement usable in FIG. 4.

Referring first primarily to FIG. 1, an instrument housing is indicated generally at 10, with cylindrical axis 11, circular end plates 12 and 14, and cylindrical side wall 16. Plate 12, which will be referred to for convenience as the top plate, but without implying any limitation on the actual orientation of the instrument, is centrally apertured at 13. Plate 12 is preferably provided with a peripheral mounting flange 13a by which the instrument may conveniently be mounted in an aircraft or the like with the outer face of plate 12 in the plane of the aircraft surface at the point where the air stream direction is to be measured. A probe assembly, indicated generally by the numeral 20, is mounted on top plate 12 with its axially symmetrical sensing portion 22 projecting upward through aperture 13. The longitudinal axis 21 of the probe ordinarily coincides with axis 11, but is deflectable therefrom about a point substantially in the surface of plate 12 in response to air pressure acting on sensing portion 22. The probe is typically mounted by means of a flexible metal diaphragm 24, which also serves to seal aperture 13. A rigid protective cover may be provided just outside of diaphragm 24, with a small clearance aperture for the probe, but is omitted from the drawing for clarity of illustration.

In the present embodiment, the angle of deflection of probe 20 from axis 11 is positively limited, but in such a way as to leave the probe free to swing in azimuth about that axis. That angular control is provided by the stop ring 30, which is fixedly mounted by the brackets 32 within the housing coaxially of axis 11. The lower end of probe 20 extends downward through the ring, and preferably carries an antifriction device, such as the ball bearing 34, in position to engage the inner periphery of ring 30. A counterbalance weight 28 is preferably mounted in axially adjustable position on the probe, to facilitate accurate balancing of the probe assembly about its effective pivot point at diaphragm 24. Since the exposed portion 22 of the probe is axially symmetrical, and since the diaphragm is uniformly flexible in all azimuths, the azimuth of deflection of the probe assembly conforms accurately to the direction of the airstream across the exterior face of plate 12.

The azimuth of probe deflection is sensed by a light-responsive transducer indicated schematically at 40, which is preferably of a type that provides substantially infinite resolution. A well-defined spot of light is produced on the surface of transducer 40 by a suitable optical system which includes reflective optical means carried by the probe assembly. As illustrated in FIG. 1, that optical system includes a light source 44, which may be of conventional design, and which projects a beam of light upwardly along main axis 11, as indicated schematically at 45. A reflective optical element 50, which may typically comprise a plane mirror, is mounted on the lower end of probe assembly 20 in a plane perpendicular to the probe axis. That mirror is large enough in radius to intersect light beam 45 even when the probe is fully deflected. The reflected beam 46 strikes a mirror 52, which is fixedly mounted on housing end plate 13 coaxially of main axis 11. The light beam is thereby returned upwardly, as indicated at 47, and is again reflected down at 48 by probe mirror 50. Beam 48 strikes transducer element 40 at a point indicated at 49, forming a sharp image at that point due to focusing action of light source 44. Due to the axial symmetry of the optical system, image 49 lies in the plane defined by main axis 11 and the axis of the deflected probe assembly. Since the azimuth angle of that plane with respect to fixed axis 11 corresponds to the direction of the fluid stream by which probe 20 is deflected, the circumferential position of image 49 constitutes an accurate measure of the airstream direction.

Various types of optical transducer may be employed at 40. An illustrative, and particularly advantageous, transducer structure for that purpose may be constructed, as already indicated, by interposing a photoconductive element between an electrode and a resistive element, so that the electrode and resistive element are effectively isolated electrically except at points where the photoconductive layer is illuminated and thereby rendered locally conductive. Such structures can be made in arcuate form, and are in many ways analagous to ordinary potentiometers, but completely avoid two serious problems presented by conventional potentiometers for application in sensitive instruments. Those difficulties are the friction that must be overcome to move the wiper of a conventional potentiometer, thus loading the input system; and the limitation upon the sensitivity of a wire wound potentiometer that results from the discrete changes of output voltage as the wiper moves from one turn to the next. Movement of a light beam over the photoconductive surface of the present type of potentiometer involves no friction; and, even if the resistive element should be formed with discrete turns, the effective conduction is typically transferred with complete smoothness from one turn to the next.

Illustrative detailed structure of transducer 40 is illustrated schematically in FIG. 2, which represents only a short section of the circular formation. A support 60 of insulative material, such as glass, for example, provides a flat surface for deposition of relatively thin layers of material, which are shown of exaggerated thickness for clarity of illustration. Layer 62 of resistive material may be formed by chemical or vacuum deposition of a suitable metal in appropriate thickness to provide the desired specific resistivity. Electrical connections 63 and 64 are provided at the respective ends of conductive strip 62, for supply of electrical potential from any suitable source, indicated schematically at 70. Superposed on layer 62 is a layer 66 of photoconductive material, such, for example, as lead or cadmium sulphide or selenide, antimony trioxide, anthracene, zinc oxide and selenium. Such materials may be applied to a surface by many known procedures, including, for example, evaporation in vacuum, chemical deposition or application of a suitable paint-like composition comprising powdered or sintered material suspended in a suitable binder which will harden to form a solid coating. A highly conductive layer 68 is superposed upon layer 66 and serves as electrode. An electrical connection is provided, as indicated at 69, for supplying the tapped voltage to an indicating instrument or other utilization device of any desired type, indicated schematically at 72. Layer 68 is typically an evaporated film of silver or other metal that provides relatively high conductivity in a layer that is still thin enough to transmit light readily to photoconductive layer 66. The light image 49 is indicated schematically in FIG. 2, and can be considered to penetrate through electrode layer 68 and to permeate the entire thickness of photoconductive layer 66, rendering the latter conductive and producing a local electrical connection between the electrode and the potentiometer resistance layer 62. Transducer 40 can also be constructed with a resistive layer of light-transmitting construction as the surface layer, and electrode 68 below.

FIG. 3 represents an alternative anti-friction device 34, comprising a hub formation 80 of magnetizable material with upper and lower external flanges 81 and 82. Stop ring 30 supports an annular formation 84 with similar internal flanges 85 and 86. Hub 80 and annular formation 84 are permanently magnetized in a generally axial direction, producing north and south poles arranged as indicated in the drawing, so that each pole of formation 84 is directly opposed by a like pole of hub 80. Those poles repel, effectively preventing contact of the magnetized elements. An advantage of the stop structure of FIG. 3 is that it effectively eliminates any friction tending to prevent change of azimuth of sensing element 20, while still maintaining that element at a substantially constant angle with main axis 11 for a wide range of airstream velocities.

The illustrative transducer structure represented in FIG. 2 is intended to be representative of many different types of light-responsive transducers that are capable of providing an electrical signal corresponding to the azimuth angle of the light image 49.

FIG. 4 represents a modification which is similar in many respects to FIG. 1, corresponding parts being generally designated by the same numerals. FIG. 4 is illustrative of optical systems that provide a light image 49 corresponding to image 49 of FIG. 1; and also produce a light image 49a at a point of transducer 40 diametrically opposite to image 49. The radial distances of the two images from axis 11 may be slightly different, as shown in FIG. 4 so that they illuminate different zones 90 and 91 of the transducer; or may be equal, as represented in FIG. 5. For producing two such images, the initial light beam 45 is typically reflected at mirrors 50 and 52, forming the successive reflected beams 46 and 47, as in FIG. 1. A peripheral portion of mirror 50 has a slightly conical surface 51, which receives the radially outer half of light beam 47 and reflects it diagonally across main axis 11 to form image 49a. The remainder of beam 47 strikes the plane portion of mirror 50 and is imaged at 49, essentially as in FIG. 1. By slightly changing the angle of conical mirror zone 51, image 49a may be placed in any desired radial relation to image 49.

The latter arrangement is particularly useful for operating a transducer for producing an output signal of modified synchro type, as shown schematically in FIG. 5. A circular photosensitive element 80 is positioned between coaxial resistance and electrode elements, essentially as in FIG. 2. The elements may be superposed as in FIG. 2, but are shown radially adjacent for clarity of illustration. The electrode is divided into two mutually insulated diametrically opposed portions 82 and 84, to which alternating current power is supplied via lines 83 and 85. The output signal is taken from the resistance element 86 via three output lines 87, 88 and 89, which are connected to said element at points 120° apart. When light images 49 and 49a illuminate diametrically opposite areas of the photosensitive element, forming connections between the resistance element and the respective electrode portions, the output signal on lines 87, 88 and 89 is a 3-phase signal representing the angle of the diameter through the images. When such a transducer is used at 40 of FIG. 4, the output signal represents the azimuth of the fluid stream by which sensor 20 is deflected.

I claim:
1. A system responsive to the direction of a fluid stream flowing generally parallel to the outer surface of a wall, said system comprising in combination
   an elongated sensor element having a longitudinal sensor axis and an axial pivot point intermediate its length, and having at one end outward of the pivot point a working portion with an external surface that is axially symmetrical with respect to the longitudinal axis, means mounting the sensor element with said working portion extending outwardly from the wall transversely of the fluid stream, said mounting means defining a normal position of the sensor axis essentially perpendicular to the wall and permitting limited universal swinging movement of the sensor element about its pivot point from said normal position in response to lateral pressure of the fluid stream upon the working portion of the sensor, means limiting the magnitude of said swinging movement to a definite maximum angular deflection from said normal position, while permitting that deflection to assume a continuous range of azimuth angles with respect to said normal position, optical means comprising an optically reflective surface mounted on the sensor inwardly of the wall surface and lying in a surface of revolution with respect to the sensor axis, means for producing a light beam directed parallel to the normal position of the sensor axis and incident upon the optical means, light responsive transducer means of arcuate form fixedly mounted coaxially of the normal position of the sensor axis in position to receive light from the optical means at said maximum deflection and in any azimuth position of the sensor within said range, and output means controlled by said transducer means for indicating the azimuth angle of the sensor element deflection.

2. A system as defined in claim 1, and wherein said optically reflective surface lies essentially in a plane perpendicular to the sensor axis, said optical means including a fixedly mounted auxiliary optical reflective surface for returning said reflected light to the first said reflective surface for additional reflection thereby prior to receipt by said transducer means.

3. A system as defined in claim 1, and wherein said optically reflective surface comprises two zonal portions set at different angles with respect to the sensor axis and adapted to reflect different portions of said light beam to respective areas of said transducer means that are diametrically opposite each other, said output means being responsive to illumination of said two areas of the transducer means to produce an output signal of modified synchro type that represents the azimuth angle of the sensor element deflection.

4. A system as defined in claim 1, and wherein said transducer means comprise a light responsive potentiometer of arcuate form, means for supplying electric power to the potentiometer, and circuit means for deriving a voltage signal from the potentiometer in response to the azimuth angle of said reflected light.

5. A system as defined in claim 1, and wherein said transducer means comprise elongated electrically resistive means, elongated electrode means in parallel spaced relation to the resistive means, a layer of photoconductive material interposed between the resistive means and electrode means and electrically engaging the same, means for supplying power to one of said elogated means, and means for conducting an output voltage from the other of said elongated means.

References Cited by the Examiner

UNITED STATES PATENTS

| | | | |
|---|---|---|---|
| 1,447,646 | 3/1923 | Cherry | 250—211 X |
| 2,378,526 | 6/1945 | Agnew | 250—231 X |
| 2,480,134 | 8/1949 | Harrington | 250—230 X |
| 2,534,463 | 12/1950 | MacCallum | 250—230 X |
| 2,777,070 | 1/1957 | Stamper et al. | 250—231 X |
| 2,879,405 | 3/1959 | Pankove | 250—211 |
| 2,896,086 | 7/1959 | Wunderman | 250—211 |
| 3,033,073 | 5/1962 | Shuttleworth | 250—211 X |
| 3,087,069 | 4/1963 | Moncrieff-Yeates | 250—211 |
| 3,093,741 | 6/1963 | Meyer | 250—230 X |
| 3,129,416 | 4/1964 | Freedman | 250—211 |

OTHER REFERENCES

Potentiometer Infinite Resolution, Low Noise, Electronics, vol. 34, No. 32, Aug. 11, 1961, page 178.

RALPH G. NILSON, *Primary Examiner.*

ARCHIE R. BORCHELT, *Examiner.*